US005894325A

United States Patent [19]
Yonemoto

[11] Patent Number: 5,894,325
[45] Date of Patent: Apr. 13, 1999

[54] SOLID IMAGE PICKUP UNIT AND VIDEO CAMERA EMPLOYING SAME

[75] Inventor: Kazuya Yonemoto, Tokyo, Japan

[73] Assignee: Sony Corporation, Tokyo, Japan

[21] Appl. No.: 08/659,311

[22] Filed: Jun. 6, 1996

[30] Foreign Application Priority Data

Jun. 7, 1995 [JP] Japan ................... 7-140446

[51] Int. Cl.$^6$ ................... H04N 5/335
[52] U.S. Cl. ................... 348/302; 348/208; 348/296
[58] Field of Search ................... 348/302, 304, 348/314, 296, 299, 208, 294, 297, 308, 311, 312; H04N 5/335

[56] References Cited

U.S. PATENT DOCUMENTS

| Re. 34,309 | 7/1993 | Tanaka et al. | 348/302 |
|---|---|---|---|
| 4,242,706 | 12/1980 | McCormack et al. | 348/164 |
| 4,609,825 | 9/1986 | Berger et al. | 348/324 |
| 4,980,771 | 12/1990 | Ueda et al. | 348/323 |

*Primary Examiner*—Tuan V. Ho
*Attorney, Agent, or Firm*—Hill & Simpson

[57] ABSTRACT

A solid image pickup unit is provided which is capable of preventing the brightness of a reproduced screen from changing (a change in a storage time) due to hand shake correction and which is thus able to obtain a natural photographed image. An X-Y address-type solid image pickup unit having a hand shake correction function includes a reading vertical scanner for reading in sequence pixel information for each scanning line while performing vertical scanning and for determining the position of an image pickup area in the vertical direction within a photoreceiving surface on the basis of hand shake information, an electronic shutter scanner for resetting the pixel transistors in correspondence with the position of the image pickup area in the vertical direction when a predetermined storage time is reached whose upper limit is set to be shorter than the time corresponding one field, and a timing generator for supplying scanning clocks $\phi$VCK and $\phi$SCK and start pulses $\phi$VS and $\phi$SS to these scanners and for controlling the generation timing of the start pulses $\phi$VS and $\phi$SS on the basis of the hand shake information from an acceleration sensor.

10 Claims, 9 Drawing Sheets

SOLID IMAGE PICKUP UNIT AND VIDEO CAMERA EMPLOYING SAME

BACKGROUND OF THE INVENTION

1. Field of the Invention

The present invention relates to a solid image pickup unit and a video camera employing the same. More particularly, the present invention relates to an X-Y address-type solid image pickup unit which has a photoreceiving surface of an area larger than an image pickup area for outputting a video signal, and in which pixel information is read for each scanning line and is reset.

2. Description of the Related Art

In the case of an X-Y address-type solid image pickup unit typified by an amplification type solid image pickup unit or an MOS type solid image pickup unit, unlike a charge transfer type solid image pickup unit typified by a CCD type solid image pickup unit in which information of all the pixels is read at the same time in a vertical blanking time period, pixel information is read for each scanning line and is reset, and therefore the X-Y address-type solid image pickup unit is called a focal plane shutter. For this reason, in the X-Y address-type solid image pickup unit, the storage time period of pixels is shifted for each pixel row in correspondence with each scanning line. That is, there is a lag of approximately 1/60 sec between the pixel of the topmost portion of the angle of view (the image pickup area) and the pixel of the bottommost portion.

In the X-Y address-type solid image pickup unit having a hand shake correction function, an example will be shown in which 20% of hand shake correction is possible with 120% of the image pickup area being the entire photoreceiving surface, as shown in FIG. 10. In an extreme case, if it is assumed that the image pickup area is positioned in the topmost in a certain field, and the image pickup area is moved to the bottommost in the next field, the pixel row of the certain line reaches the read timing shown in FIG. 11, and the signal from the moved field increases by 20% in the storage time period more than the signal of the previous field, and becomes 1.2 times greater than 1/60 sec. As a result, when the image pickup area moves to the bottom of the figure, the storage time period becomes long, and becomes short when the image pickup area moves to the top of the figure. Therefore, problems arise, for example, the phenomenon of the reproduced screen brightening or darkening occurs.

SUMMARY OF THE INVENTION

The present invention has been achieved in view of the above-described problems. It is an object of the present invention to provide a solid image pickup unit capable of preventing a change (change in the storage time period) in the brightness of a reproduced screen due to hand shake correction and thus is capable of obtaining a natural photographed image.

In one aspect of the present invention, there is provided an X-Y address-type solid image pickup unit which has a photoreceiving surface of an area larger than an image pickup area for outputting a video signal, and in which pixel information is read out for each scanning line and is reset, the solid image pickup unit comprising: a first vertical scanning circuit for reading pixel information in sequence for each scanning circuit while performing vertical scanning, and for determining the position of the image pickup area in the vertical direction within the photoreceiving surface on the basis of hand shake information; a second vertical scanning circuit for resetting pixels according to the position of the image pickup area in the vertical direction when a predetermined storage time period is reached whose upper limit is set to be shorter than a time corresponding to one field (or one frame); and a timing generator for supplying various timing signals to the first and second vertical scanning circuits.

In another aspect of the present invention, there is provided an X-Y address-type solid image pickup unit which has a photoreceiving surface of an area larger than an image pickup area for outputting a video signal, and in which pixel information is read out for each scanning line and is reset, the solid image pickup unit comprising: a vertical scanning circuit for reading pixel information in sequence for each scanning circuit while performing vertical scanning, and for determining the position of the image pickup area in the vertical direction within the photoreceiving surface on the basis of hand shake information; and a timing generator for supplying a clock pulse of a fixed period to the vertical scanning circuit during the scanning of the image pickup area and for supplying a clock pulse of a period shorter than the fixed period over the scanning time period of the area other than the image pickup area during the vertical blanking time period of a video signal.

In the X-Y address-type solid image pickup unit having the above-described construction, the first vertical scanning circuit reads in sequence pixel information for each scanning line while performing vertical scanning, and determines the position of the image pickup area in the vertical direction within the photoreceiving surface on the basis of a timing signal supplied at a timing based on the hand shake information from the timing generator during the hand shake correction. The second vertical scanning circuit sets the upper limit of the storage time period of an electronic shutter to be a predetermined time shorter than a time corresponding to one field (or one frame), and resets the pixel in correspondence with the position of the image pickup area in the vertical direction. As a result, it is possible to prevent a change in the storage time period due to the hand shake correction.

Further, in addition to an X-Y address-type solid image pickup unit in which the upper limit of the storage time period of an electronic shutter is set at a predetermined time shorter than a time corresponding to one field (or one frame), and the pixel is reset in correspondence with the position of the image pickup area in the vertical direction, even in an X-Y address-type solid image pickup unit which does not employ such a construction, the timing generator supplies a clock pulse of a period shorter than the period of a clock pulse during the scanning of the image pickup area over the scanning time period of an ineffective pixel area other than the image pickup area (effective pixel area) during the vertical blanking time period of a video signal. As a result, scanning is performed in the ineffective pixel area at a speed higher than in the effective pixel area.

The above and further objects, aspects and novel features of the invention will become more apparent from the following detailed description when read in connection with the accompanying drawings.

DESCRIPTION OF THE PREFERRED EMBODIMENT

An embodiment of the present invention will be explained below in detail with reference to the accompanying drawings.

Figure 1:
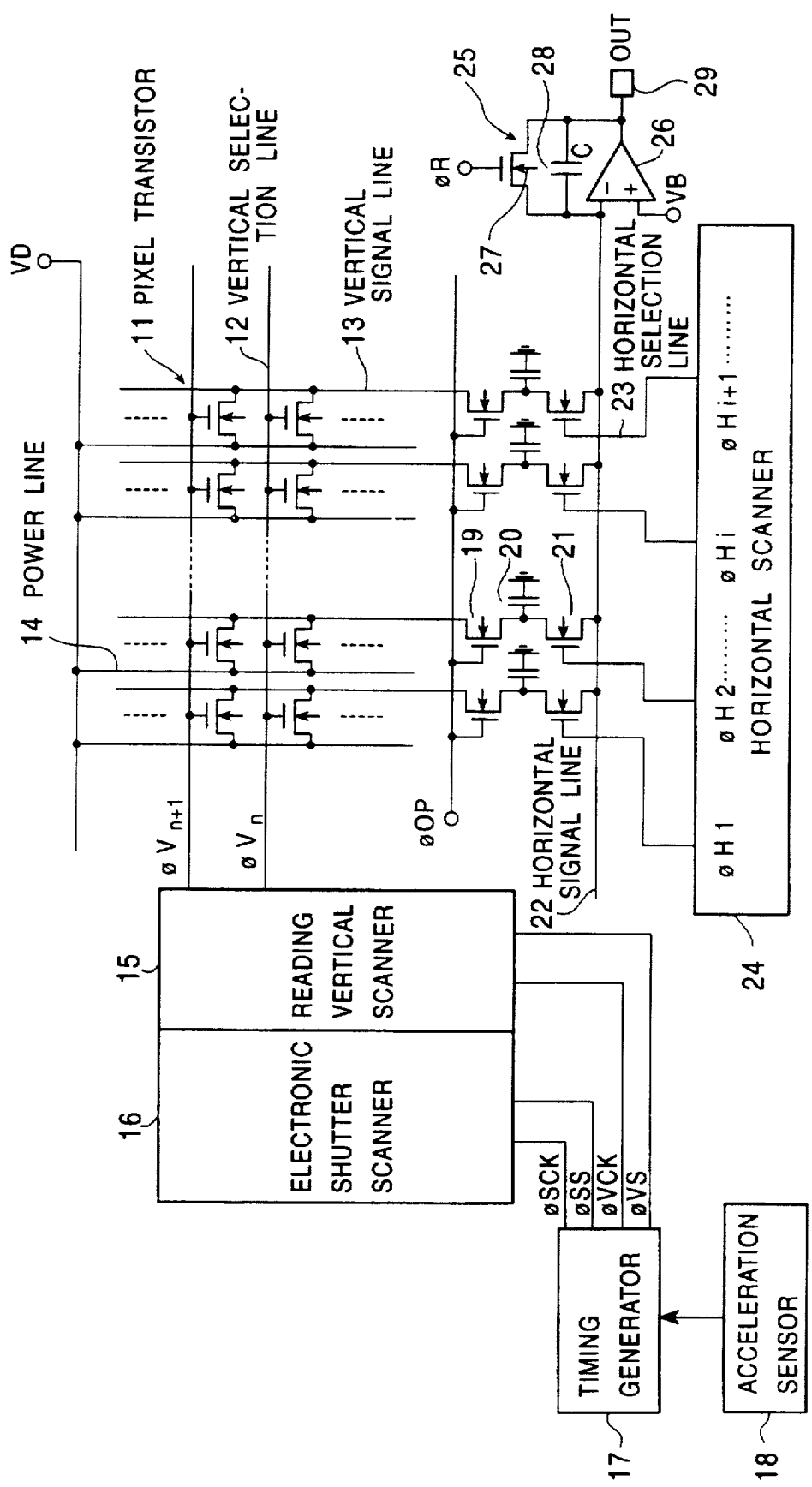
FIG. 1 is a diagram illustrating an embodiment of the present invention.

FIG. 1 is a diagram illustrating an embodiment of the present invention. Referring to FIG. 1, a number of pixel transistors (MOS type transistors are shown in this embodiment) 11 are arrayed in a matrix form, and thus a photoreceiving surface is formed having an area larger than an image pickup area from which a video signal is output. In these pixel transistors 11, each gate electrode (control electrode) is connected to a vertical selection line 12 in row units, each source electrode is connected to a vertical signal line 13 in column units, and each drain electrode is connected to a power-supply VD through a power line 14.

The vertical selection line 12 reads in sequence pixel information for each line while vertical scanning is performed, and is connected to a vertical scanning circuit 15, which is a first vertical scanning circuit, for determining the position of the image pickup area in the vertical direction during a hand shake correction operation and to an electronic shutter scanner 16, which is a second vertical scanning circuit, for resetting the pixel transistors 11 according to the position of the image pickup area in the vertical direction and for preventing a change in the storage time during the hand shake correction operation. Supplied from a timing generator 17 to the reading vertical scanner 15 and the electronic shutter scanner 16 are scanning clocks φVCK and φSCK, each from a different system, and start pulses φVS and φSS, each from a different system. This makes it possible for the reading vertical scanner 15 and the electronic shutter scanner 16 to independently perform scanning.

The timing generator 17 generates various timing signals, including the above-mentioned scanning clocks φVCK and φSCK and start pulses φVS and φSS, in accordance with a reference clock of a predetermined frequency. Supplied to the timing generator 17 is a detection output from hand shake detecting means, for example, an acceleration sensor 18, mounted in the video camera, for detecting the hand shake state when the hand of the photographer who holds the camera shakes. The timing generator 17, when hand shake information is supplied thereto from the acceleration sensor 18, controls the generation timing of the start pulses φVS and φSS for the reading vertical scanner 15 and the electronic shutter scanner 16.

Figure 2A:
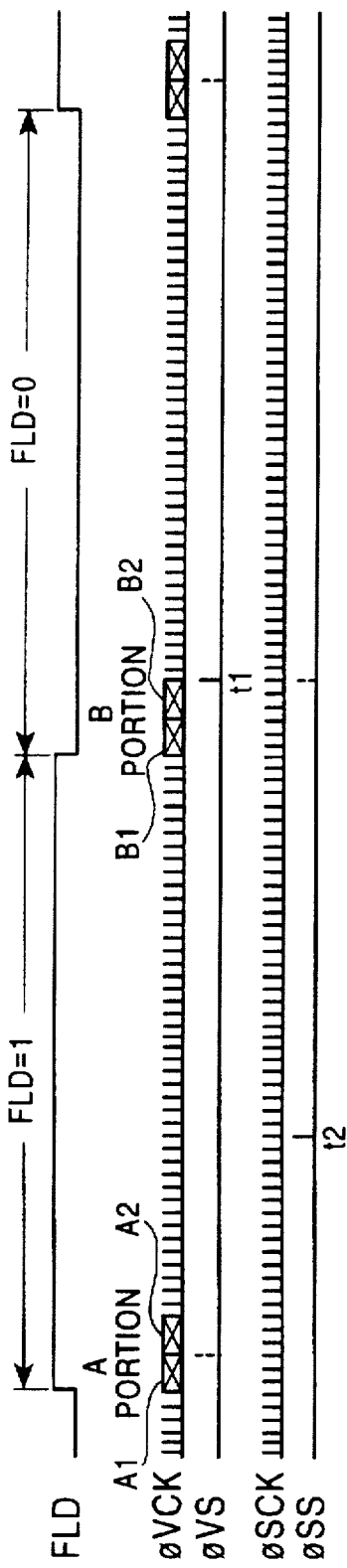
FIGS. 2A and 2B are timing charts illustrating a timing relation between scanning clocks φVCK and φSCK, and start pulses φVS and φSS.
Figure 2B:
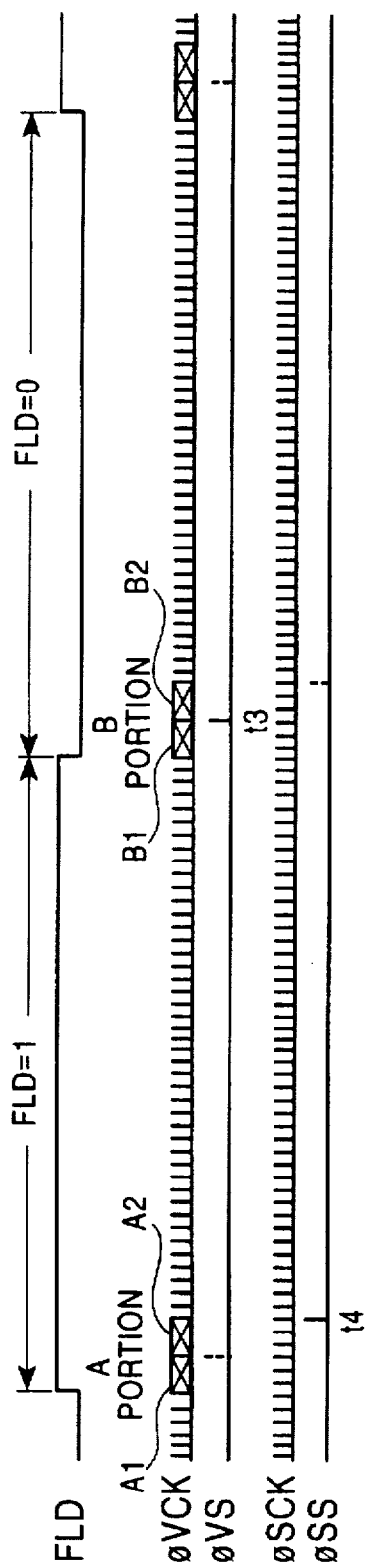

FIG. 2 shows a timing relation between the scanning clocks φVCK and φSCK, and the start pulses φVS and φSS, which are generated from the timing generator 17. In FIG. 2, the scanning clock φVCK supplied to the reading vertical scanner 15 changes to a high-speed (short period) clock in the A portion and the B portion (portions marked with x in the figure) corresponding to the vertical blanking time period of the video signal. This high-speed clock makes it possible to perform the scanning of the vertical scanning circuit 15 at a high speed. The start pulse φVS supplied to the reading vertical scanner 15 is generated in the portions of the high-speed clock (the A and B portions). By controlling the generation timing of the start pulse φVS by the timing generator 17 on the basis of the hand shake information supplied from the acceleration sensor 18, it is possible to freely set the position of the image pickup area in the vertical direction within the photoreceiving surface.

On the other hand, the scanning clock φSCK supplied to the electronic shutter scanner 16 is not changed to a high-speed clock and is generated always at a fixed timing, and the electronic shutter scanner 16 performs scanning in advance so that the storage time becomes constant with respect to the movement of the image pickup area in the vertical direction within the photoreceiving surface. In the timing charts of FIG. 2, in case (A) (when it is desired to place the image pickup area within the photoreceiving surface in the bottommost position in the field of FLD=0), the timing generator 17 generates the start pulse φVS in the B portion at the timing of t1, and generates the start pulse φSS corresponding to the start pulse φVS at the timing of t2 in the previous field (FLD=1). In contrast, in case (B) (when it is desired to place the image pickup area within the photoreceiving surface in the topmost position), the start pulse φVS in the B portion is generated at the timing of t3, and the start pulse φSS corresponding to the start pulse φVS is generated at the timing of t4 in the previous field.

Incidentally, in the A and B portions where a high-speed clock is formed, the time periods of the A1 and B1 portions in the forward portion and the A2 and B2 portions in the rearward portion are set so as to fall respectively in the scanning time period of an ineffective pixel area other than the image pickup area (effective pixel area). As an example, in a solid image pickup unit in which 20% of hand shake correction is possible with 120% of the image pickup area being as the entire photoreceiving surface, if it is assumed that the number of lines of the image pickup area is, for example, 1,000, since the number of lines of the ineffective pixel area is 200, the time periods of the A1 and B1 portions in the forward portion and the A2 and B2 portions in the rearward portion are set respectively at a scanning time period for 200 lines.

As described above, by making the reading vertical scanner 15 perform high-speed scanning by supplying a high-speed clock to the scanner 15 over a time period two times greater than the scanning time period of the ineffective pixel area, namely, the scanning time period for a total of 400 lines during the vertical blanking time period, the simultaneous selection of two lines within the scanning time period of one field can be avoided. As a result, since the vertical selection lines 12 having a relatively large capacity can be driven surely one by one, the power capacity of a driver for driving the vertical selection lines 12 can be lowered.

In the A and B portions where a high-speed clock is formed, the A1 and B1 portions in the forward portion and the A2 and B2 portions in the rearward portion need not always to be provided as described above. Although there may be a fear that a case occurs in which two lines might be selected at the same time within the scanning time period of one field, if there is a circuit-related operational allowance, only the A2 and B2 portions in the rearward portion may be provided. That is, during the vertical blanking time period, a high-speed clock is supplied to the reading vertical scanner 15 over the scanning time period of the ineffective pixel area (for an amount of 200 lines in this embodiment). With such a construction, in the case of a solid image pickup unit having a number of pixels, for example, being HD (High Definition)-ready, since a time allowance within the vertical blanking time period can be made, the frequency of the high-speed clock can be set to be low (e.g., to one half). As a result, the operation of a shift register which constitutes the reading vertical scanner 15 can be performed more surely.

Referring back to FIG. 1 again, connected to one end of each vertical signal line 13 is a drain electrode of an NchMOS transistor 19, which is an operating switch placed for each vertical row. The source electrode of the MOS transistor 19 is grounded via a load capacitor 20, and an operating pulse $\phi$OP is applied to the gate electrode. Connected to the source electrode of the MOS transistor 19 is the drain electrode of an NchMOS transistor 21 which is a horizontal switch. The source electrode of the MOS transistor 21 is connected to a horizontal signal line 22, and the gate electrode thereof is connected to a horizontal selection line 23. The horizontal selection line 23 is connected to a horizontal scanner 24.

Connected to one end of the horizontal selection line 23 is the input terminal of a charge detection circuit 25. The charge detection circuit 25 is composed of an inversion amplifier 26 whose inversion (−) input terminal is connected to one end of the horizontal selection line 23 and whose non-inversion (+) input terminal is applied by a predetermined voltage VB; an NchMOS transistor 27 which is a reset switch connected between the inversion (−) input terminal and the output terminal of the inversion amplifier 26, with a reset pulse $\phi$R being applied to the gate electrode of the MOS transistor 27; and a detection capacitor 28 which is connected in parallel to the MOS transistor 27. The output terminal of the inversion amplifier 26 is connected to a circuit output terminal 29.

Figure 3:
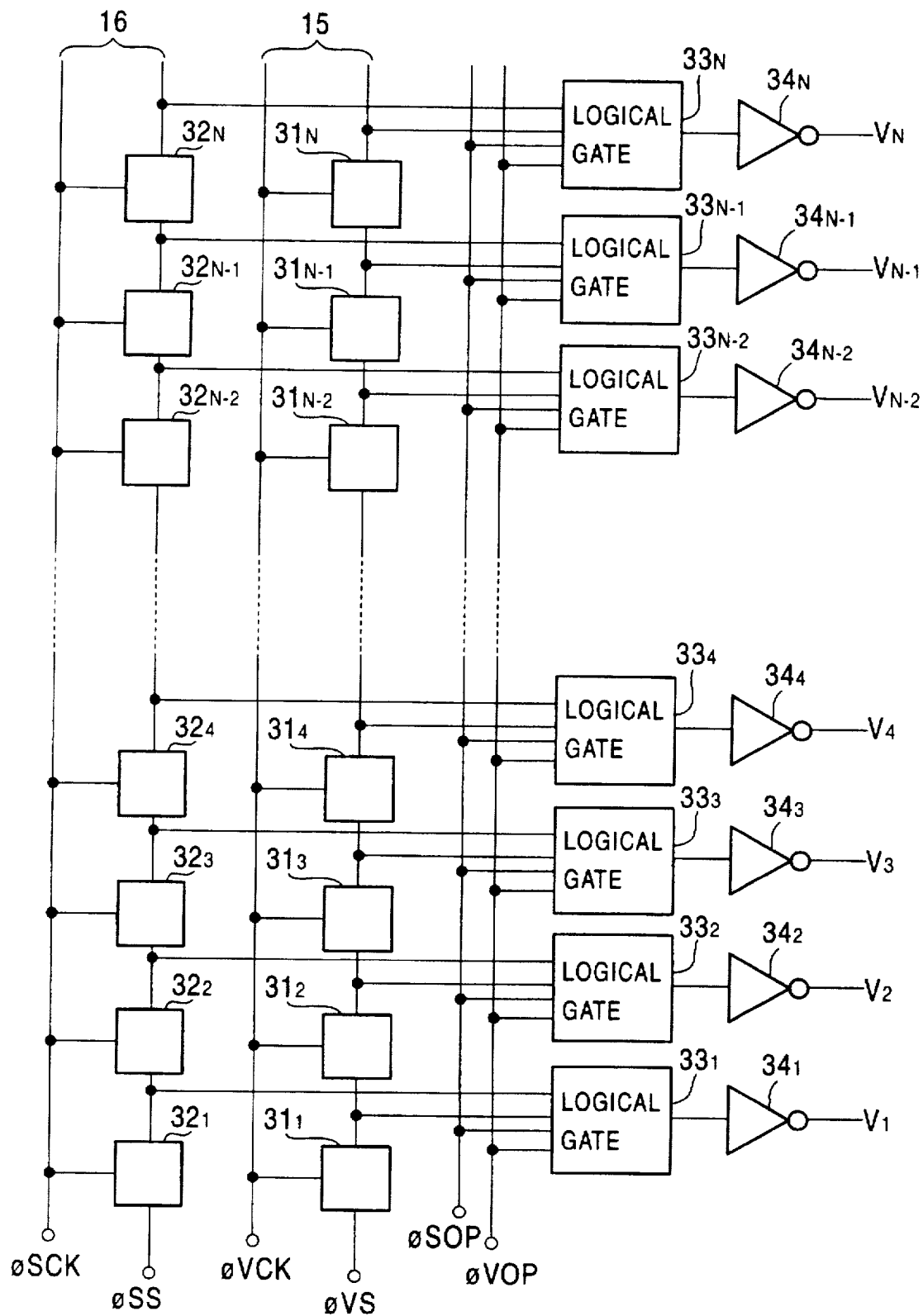
FIG. 3 is a block diagram illustrating a specific example of a scanner.

FIG. 3 shows an example of a specific construction of each of the reading vertical scanner 15 and the electronic shutter scanner 16. In FIG. 3, the reading vertical scanner 15 is constituted of N cascade-connected shift registers $31_1$ to $31_N$. Similarly, the electronic shutter scanner 16 is constituted of N cascade-connected shift registers $32_1$ to $32_N$. In the reading vertical scanner 15, the start pulse $\phi$VS is supplied to the shift register $31_1$ at the first stage, and the scanning clock $\phi$VCK is applied to the shift registers $31_1$ to $31_N$ at the respective stages. In the electronic shutter scanner 16, the start pulse $\phi$SS is supplied to the shift register $32_1$ at the first stage, and the scanning clock $\phi$SCK is applied to the shift registers $32_1$ to $32_N$ at the respective stages.

The shift register outputs at each stage of the reading vertical scanner 15 and the electronic shutter scanner 16 form two inputs of N four-input logic gate circuits $33_1$ to $33_N$, which are provided in correspondence with each stage. As the other two inputs of the four-input logic gate circuits $33_1$ to $33_N$, the vertical operating pulse $\phi$VOP and the shutter operating pulse $\phi$SOP are supplied thereto. Each output of the four-input logic gate circuits $33_1$ to $33_N$ is applied to N vertical selection lines 12 (shown in FIG. 1) via drivers $34_1$ to $34_N$ respectively, and thus vertical scanning in which the pixel transistors 11 are selected in sequence in row units is performed.

Figure 4:
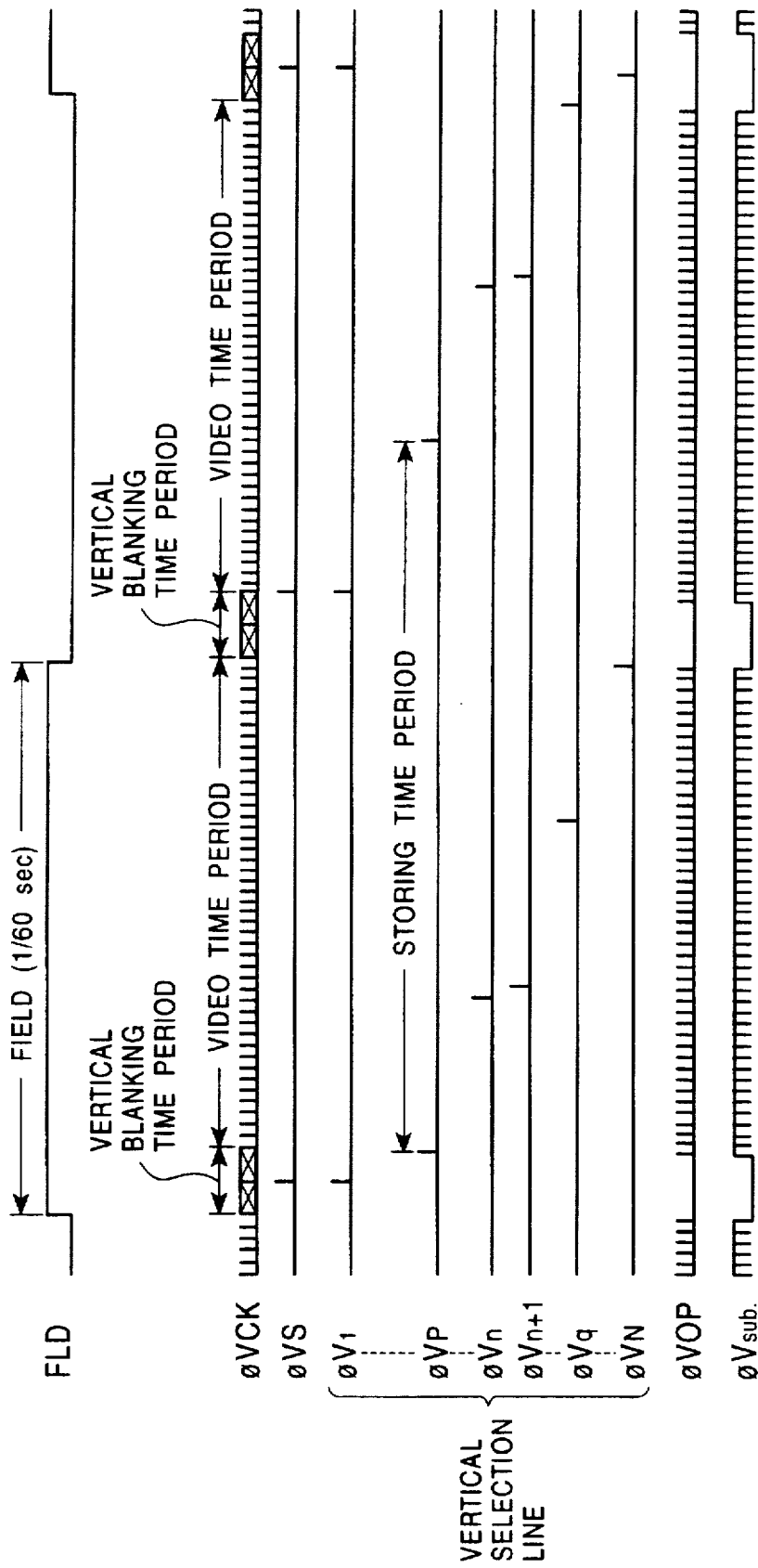
FIG. 4 is a timing chart illustrating a timing relation of vertical synchronization when an electronic shutter is not used.
Figure 5:
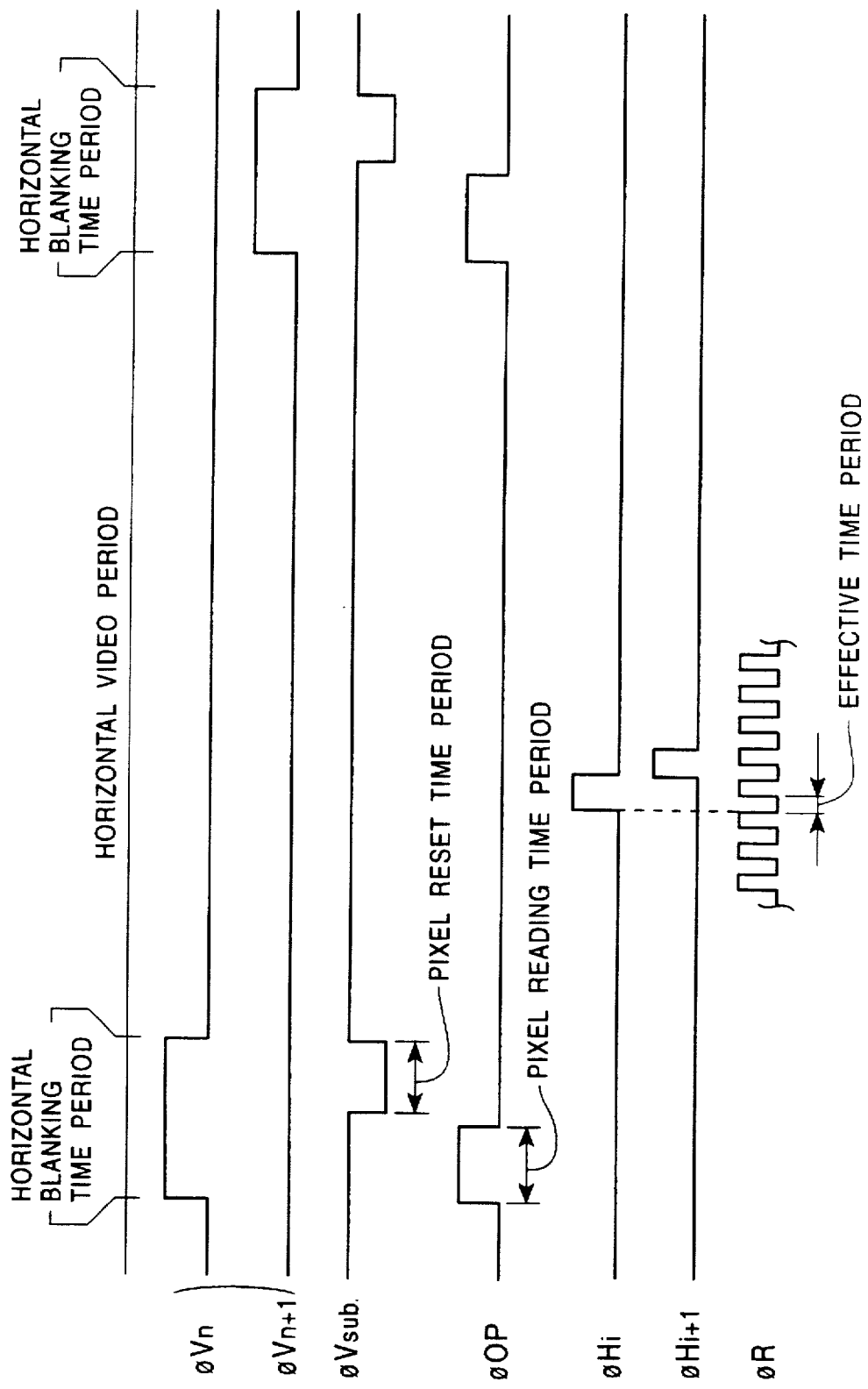
FIG. 5 is a timing chart illustrating a timing relation of horizontal synchronization when an electronic shutter is not used.

In this point, the hand shake correction operation using only the reading vertical scanner 15 as a scanner for driving the vertical selection lines 12 will be described first below with reference to the timing charts of FIGS. 4 and 5. FIGS. 4 and 5 show the timing relation of the vertical synchronization and the horizontal synchronization, respectively. In the hand shake correction operation, the timing generator 17 is able to change a pixel row selected at the beginning of the video time period by making the scanning clock $\phi$VCK for making the reading vertical scanner 15 perform scanning operate at a high speed (high frequency) during the vertical blanking time period at the beginning of each field (FLD=1 or FLD=0) and by thus changing the generation timing of the start pulse $\phi$VS of the reading vertical scanner 15 on the basis of the hand shake information from the acceleration sensor 18.

In the case of FIG. 4, the pixel row of the p-th line is output at the beginning of the video time period in the field of FLD=1, and is output up to the N-th line. As a result, the portion from the p-th to the N-th lines becomes an image pickup area for outputting a video signal. In the next field of FLD=0, the pixel row of the first line is output at the beginning of the video time period, and is output up to the q-th (=N−p) line. As a result, the portion from the first to the q-th lines becomes an image pickup area. In such a case, if, for example, the pixel row of the p-th line is taken note of, the pixel row is not read at the beginning (the timing of read pulse $\phi$V1 at the first line) of the video time period, but is read at a substantially later time in the field of FLD=0 in FIG. 4. In such case, since the storage time period becomes longer than 1/60 sec, the signal output becomes large, and the reproduced screen brightens.

Figure 6:
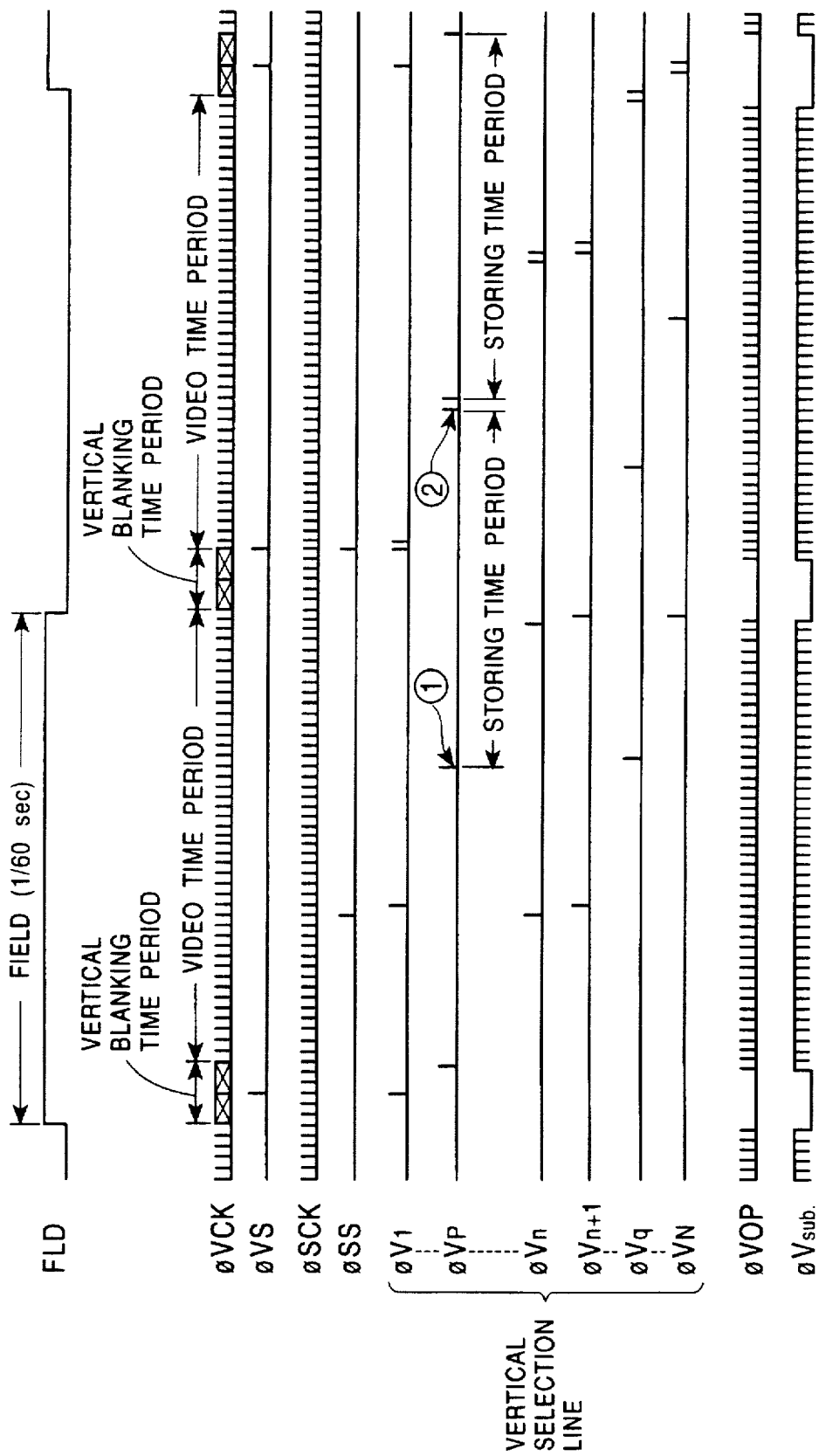
FIG. 6 is a timing chart illustrating a timing relation of vertical synchronization when an electronic shutter is used.
Figure 7:
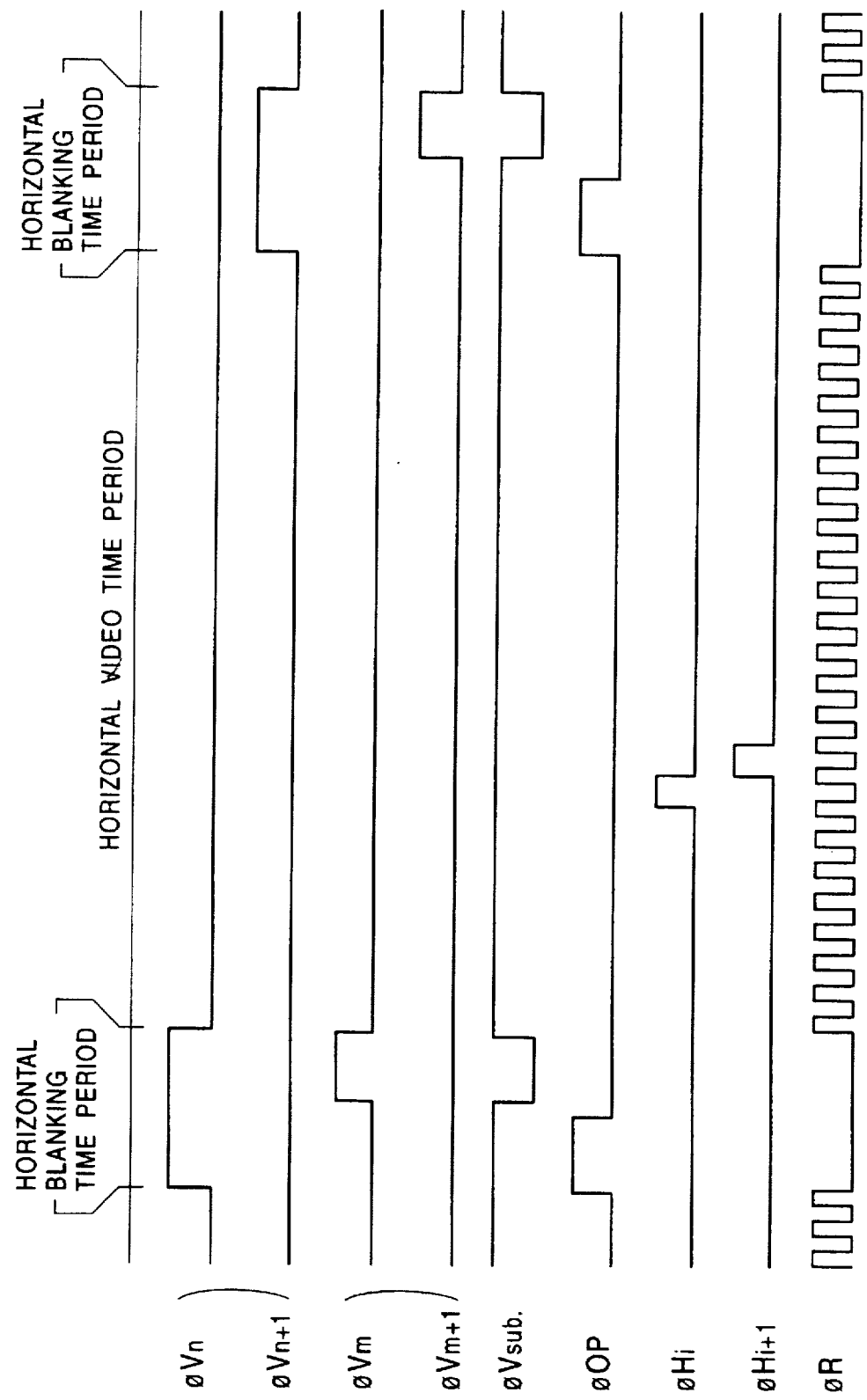
FIG. 7 is a timing chart illustrating a timing relation of horizontal synchronization when an electronic shutter is used.

Next, the hand shake correction operation in a case in which the reading vertical scanner 15 and the electronic shutter scanner 16 are used as scanners for driving the vertical selection lines 12 will be described with reference to the timing charts of FIGS. 6 and 7. FIGS. 6 and 7 show the timing relation of the vertical synchronization and the horizontal synchronization, respectively. First, in FIG. 7, when an operation of reading the pixel row of a certain line (n-th line) is performed, a pulse $\phi$Vn is made to rise in the vertical selection line 12 of the n-th line in the horizontal blanking time period. Hereinafter, this pulse is referred to as a read pulse $\phi$Vn.

This read pulse $\phi$Vn causes the pixel transistors 11 of the pixel row connected to the vertical selection lines 12 of the n-th line to change from a cut-off state to a conducting state, causing a signal voltage responsive to the signal charge stored in the respective pixels, which is caused by photoelectric conversion, to be output to the vertical signal line 13. This signal voltage is output to the load capacitor 20 via the MOS transistor 10 as a result of the MOS transistors 19, which are operating switches, beginning conducting in response to the operating pulse $\phi$OP which rises in the first half of the horizontal blanking time period, and is held as a result of the MOS transistors 19 becoming cut off.

When the MOS transistors 21 which are horizontal switches conduct in sequence due to the horizontal scanning by the horizontal scanner 24 during the horizontal video time period, the video signal held in the load capacitor 20 flows to the horizontal signal line 22 as a signal charge, and the signal charge is detected by the charge detection circuit 25 and demodulated into a signal voltage. On the other hand, in the latter half of the horizontal blanking time period, a shutter pulse $\phi$Vm rises in the vertical selection line 12 of the pixel row of a line (m-th line in FIG. 7) different from the certain line, and at the same time a shutter substrate pulse φVsub. rises in the substrate. Thereupon, the signal charges stored in the pixel row of the m-th line are reset.

FIG. 6 is a timing chart in which such an operation is developed into vertical synchronization. In the timing chart of FIG. 6, at the scanning clock φVCK of the reading vertical scanner 15, similarly to the case of FIG. 4, high-speed scanning is performed during the vertical blanking time period at the beginning of the field, as well as an operation is performed for making the reading vertical scanner 15 advance to the pixel row of the line which is selected at the beginning of the video time period, whereas at the scanning clock φSCK with no high-speed scanning, the electronic shutter scanner 16 is scanned, and the pixels are reset beforehand.

In the case of the example of FIG. 6, in the field of FLD=0, the start pulse φVS of the reading vertical scanner 15 is made to rise at the end of the high-speed scanning in the vertical blanking time period, and the read pulse φV1 of the first line of the vertical selection line 12 is made to rise at the beginning of the video time period. If the pixel row of the first line is output at the beginning of the video time period, the rise of the start pulse φSS of the electronic shutter is delayed beforehand in the previous field, causing the reset timing of the pixels due to the scanning by the electronic shutter scanner 16 to be delayed. As a result, it is possible to make narrow the interval between the shutter pulse ① and the read pulse ② of the vertical selection line 12 of the pixel row of the p-th line, and thus the storage time does not take a long time. In contrast to this, if the pixel row of the p-th line is read at the beginning of the video time period, the start pulse φSS of the electronic shutter is made to rise earlier beforehand. In such case, the pixels are read at the same storage time as that of the previous field.

In this point, it is assumed that the upper limit of the storage time of the electronic shutter is set at a predetermined time shorter than the time corresponding to one field in the case of field storage (corresponding to one frame in the case of frame storage). As an example, a case is used in which 20% of hand shake correction is possible with 120% of the image pickup area being as the entire photoreceiving surface, and the upper limit of the storage time of the electronic shutter is set at (1/60 sec ×0.8). As a result, when the electronic shutter is not released, the storage time varies in the range of (1/60 sec ×0.8) to (1/60 sec ×1.0) when hand shake occurs. Since the electronic shutter is released with the upper limit of the storage time as (1/60 sec ×0.8), even if any hand shake occurs, it is possible to prevent the brightness of the reproduced screen from changing due to the hand shake correction.

Figure 8:
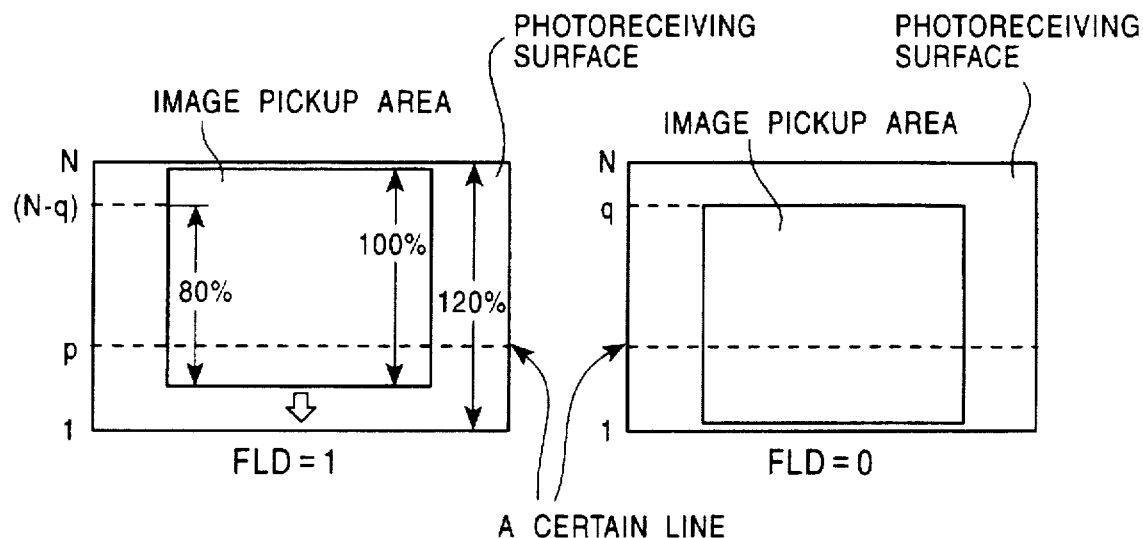
FIG. 8 is an illustration of a storage time.

The setting of the upper limit of the storage time of the electronic shutter at (1/60 sec ×0.8) can be achieved by supplying a shutter pulse to the vertical selection line 12 of the (N−q)-th line, and at the same time by supplying the scanning clocks φVCK and φSCK and the start pulses φVS and φSS to the reading vertical scanner 15 and the electronic shutter scanner 16 from the timing generator 17 so as to maintain the phase relation for resetting the pixel row of the (N−q)-th line by supplying a shutter substrate pulse φVsub. to the substrate when the pixel information of the pixel row of the p-th line is being read by supplying a read pulse to the vertical selection line 12 of, for example, the p-th line in FIG. 8 in the reading vertical scanner 15 and the electronic shutter scanner 16.

As described above, in the X-Y address-type solid image pickup unit having the hand shake correction function, since the upper limit of the storage time of the electronic shutter is set at a predetermined storage time (1/60 sec ×0.8 in this embodiment) shorter than the time corresponding to one field (or one frame), and the pixel transistors 11 are reset in correspondence with the position of the image pickup area in the vertical direction, the storage time does not vary due to the hand shake correction. Thus, it is possible to prevent the brightness of a reproduced screen from changing due to the hand shake correction.

Although the above-described embodiment describes an example in which the position of the image pickup area (the angle of view) in the vertical direction is determined on the basis of the hand shake information of one field before when the reading of the pixel information of the first line in the image pickup area is started, and the start pulse φSS is made to rise in correspondence with the predetermined position, the embodiment is not limited to this example. For example, the generation timing of the start pulse φSS may also be determined on the basis of the previous hand shake information, and the position of the image pickup area in the vertical direction may also be determined on the basis of the hand shake information up to the generation timing of the start pulse φSS. With such a construction, since the position of the image pickup area in the vertical direction can be determined on the basis of the up-to-date hand shake information, accurate hand shake correction can be realized.

Further, the generation timing of the start pulse φSS may also be set on the basis of the previous hand shake information, as well as the position of the image pickup area in the vertical direction may also be determined on the basis of the hand shake information of immediately before the pixel information of the first line in the image pickup area is read. With such a construction, since the position of the image pickup area in the vertical direction can be determined on the basis of the more up-to-date hand shake information, more accurate hand shake correction can be realized.

Figure 9:
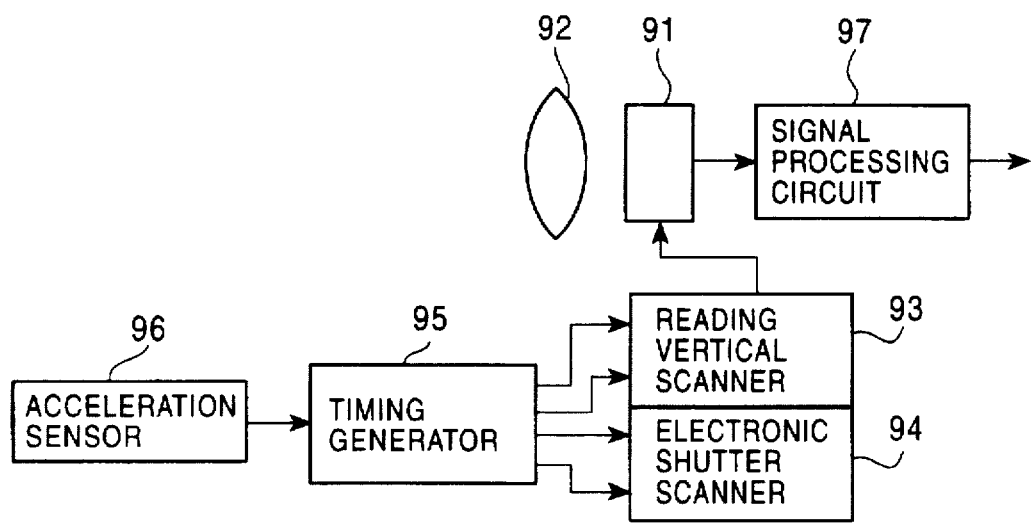
FIG. 9 is a schematic diagram of a video camera of the present invention.
Figure 10:
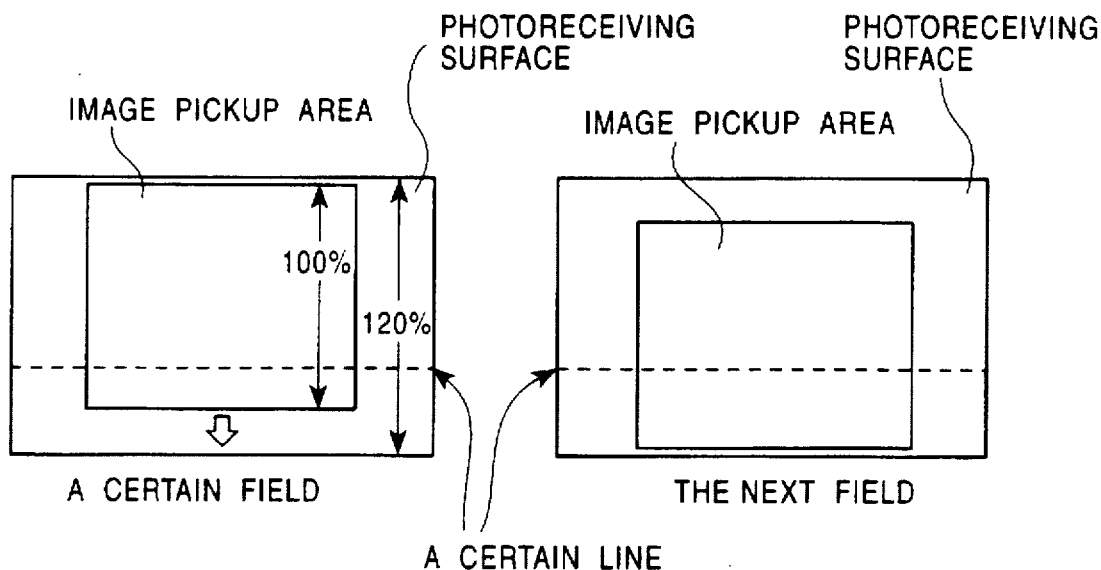
FIG. 10 is an illustration of the movement of an image pickup area due to hand shake correction.
Figure 11:
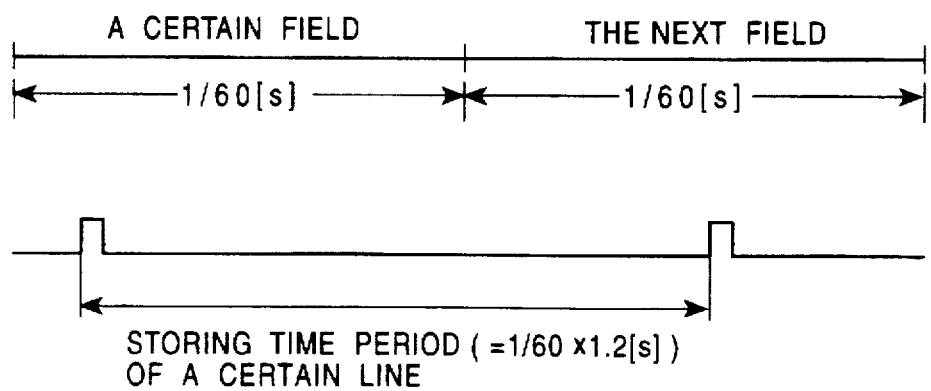
FIG. 11 is a timing chart illustrating a storage time of a certain line.

FIG. 9 is a schematic diagram of a video camera of the embodiment of the present invention. In FIG. 9, incident light is guided by an optical system 92, such as a lens, to the photoreceiving surface of an X-Y address-type solid image pickup unit 91 of an amplification type or MOS type. In the X-Y address-type solid image pickup unit 91, a reading vertical scanner 93 performs vertical scanning in order to read in sequence pixel information for each line, and the position of the image pickup area in the vertical direction is determined during the hand shake correction operation. Further, the pixels are reset in correspondence with the position of the image pickup area in the vertical direction by an electronic shutter 94, thereby preventing the storage time during the hand shake correction operation from changing.

The reading vertical scanner 93 and the electronic shutter 94 perform the above-described operations in accordance with the scanning clocks φVCK and φSCK and the start pulses φVS and φSS which are supplied from a timing generator 95. Supplied to the timing generator 95 is hand shake information from, for example, an acceleration sensor 96 serving as hand shake detecting means, mounted in the video camera, for detecting the hand shake state when the hand of the photographer who holds a camera main unit shakes. Upon receiving hand shake information from the acceleration sensor 96, the timing generator 95 controls the generation timing of the start pulses φVS and φSS on the basis of the hand shake information. The output of the solid image pickup unit 91 is derived as a photographed output through a signal processing circuit 97.

As has been described up to this point, according to the present invention, in the X-Y address-type solid image pickup unit having the hand shake correction function, since the upper limit of the storage time of the electronic shutter is set at a predetermined time shorter than the time corresponding to one field (or one frame), and is reset in correspondence with the position of the image pickup area in the vertical direction, the storage time does not vary due to the hand shake correction. Thus, it becomes possible to prevent the brightness of a reproduced screen from changing due to the hand shake correction and thus becomes possible to obtain a natural photographed image.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A solid state image pickup unit which is of an X-Y address type which has a photoreceiving surface having an area larger than an image pickup area from which a video signal is output, an in which pixel information is read for each scanning line and is reset, said solid image pickup unit comprising:

a first vertical scanning circuit for reading pixel information in sequence while performing vertical scanning, and for defining a position of said image pickup area in a vertical direction within said photoreceiving surface on the basis of hand shake information;

a second vertical scanning circuit for resetting pixels according to a position of said image pickup area in a vertical direction when a predetermined storage time period whose upper limit which is set to be shorter than a time corresponding to one field or one frame is reached; and a timing generator for supplying timing signals to said first and second vertical scanning circuits.

2. A solid state image pickup unit according to claim 1, wherein said timing generator supplies a different clock pulse and a different start pulse to said first and second vertical scanning circuits, and scanning timing of said first and second vertical scanning circuits.

3. A solid state image pickup unit according to claim 2, wherein said timing generator sets a generation timing of a start pulse with respect to said second vertical scanning circuit on the basis of the hand shake information.

4. A solid state image pickup unit according to claim 3, wherein said timing generator sets a position of said image pickup area in the vertical direction on the basis of the hand shake information up to immediately before the pixel information of the image pickup area is read.

5. A solid state image pickup unit according to claim 4, wherein said timing generator sets a position of said image pickup area in the vertical direction on the basis of the hand shake information up to the generation of a start pulse with respect to said second vertical scanning circuit.

6. A solid image pickup unit which is of an X-Y address type which has a photoreceiving surface having an area larger than an image pickup area from which a video signal is output, and in which pixel information is read for each scanning line and is reset, said solid image pickup unit comprising:

a vertical scanning circuit for reading pixel information in sequence while performing vertical scanning, and for determining a position of said image pickup area in a vertical direction within said photoreceiving surface on the basis of hand shake information;

a timing generator for supplying a clock pulse of a fixed period to said vertical scanning circuit during a scanning of said image pickup area and for supplying a clock pulse of a period shorter than said fixed period over a scanning time period of an area other than said image pickup area during a vertical blanking time period of a video signal and means for resetting pixels depending on a position of said image pick-up area in a vertical direction when a predetermined storage time period is reached.

7. A solid state image pickup unit according to claim 6, wherein said timing generator supplies a clock pulse of a period shorter than said fixed period to said vertical scanning circuit over a time period two times greater than the scanning time period of the area other than said image pickup area during the vertical blanking time period of a video signal.

8. A video camera, comprising:

an X-Y address-type solid state image pickup unit which has a photoreceiving surface of an area larger than an image pickup area for outputting a video signal, and in which pixel information is read for each scanning line and is reset;

an optical system for guiding incident light to the photoreceiving surface of said solid image pickup unit;

hand shake detecting means for detecting a shake of a hand which holds a camera main unit;

a first vertical scanning circuit for reading in sequence pixel information for each scanning line while vertically scanning said solid image pickup units and for determining a position of said image pickup area in the vertical direction within said photoreceiving surface on the basis of the hand shake information supplied from said hand shake detecting means;

a second vertical scanning circuit for resetting pixels according to the position of said image pickup area in the vertical direction when a predetermined storage time period is reached whose upper limit is set to be shorter than a time corresponding to one field or one frame; and a timing generator for supplying various timing signals to said first and second vertical scanning circuits.

9. A video camera comprising:

an X-Y address-type solid state image pickup unit which has a photoreceiving surface of an area larger than an image pickup area for outputting a video signal, and in which pixel information is read for each scanning line and is reset;

an optical system for guiding incident light to the photoreceiving surface of said solid image pickup unit;

hand shake detecting means for detecting a shake of a hand which holds the camera main unit;

a vertical scanning circuit for reading in sequence pixel information for each scanning line while vertically scanning said solid image pickup unit and for determining a position of said image pickup area in the vertical direction within said photoreceiving surface on the basis of the hand shake information supplied from said hand shake detecting means;

a timing generator for supplying a clock pulse of a fixed period to said vertical scanning circuit during a scanning of said image pickup area and for supplying a clock pulse of a period shorter than said fixed period over the scanning time period of the area other than said image pickup area during the vertical blanking time period of a video signal and means for resetting pixels depending on a position of said image pickup area in a vertical direction when a predetermined storage time period is reached.

10. A method of generating image information comprising the steps of:

providing a photoreceiving surface having an image pickup area which is less than an area of the photoreceiving surface;

generating a first vertical scanning signal to define the image pickup area based on hand shake information;

generating a second vertical scanning signal that selectively resets pixels based on the hand shake information; and limiting a charge storage time below a predetermined value by applying the second vertical scanning signal.

\* \* \* \* \*